United States Patent
Wang et al.

(10) Patent No.: US 8,045,472 B2
(45) Date of Patent: Oct. 25, 2011

(54) CREDIT MANAGEMENT WHEN RESOURCE GRANULARITY IS LARGER THAN CREDIT GRANULARITY

(75) Inventors: James Wang, Vista, CA (US); Zongjian Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 12/344,949

(22) Filed: Dec. 29, 2008

(65) Prior Publication Data

US 2010/0165842 A1  Jul. 1, 2010

(51) Int. Cl.
   *H04L 12/26* (2006.01)
(52) U.S. Cl. ........ 370/235; 370/351; 370/389; 370/412; 710/1; 710/29; 710/100; 710/305
(58) Field of Classification Search .......... 370/229–241, 370/351, 389, 395.1, 395.7–395.72, 412, 370/428–429; 710/1, 29, 100, 305–317
See application file for complete search history.

(56) References Cited

U.S. PATENT DOCUMENTS

| | | | |
|---|---|---|---|
| 5,832,245 A | 11/1998 | Gulick | |
| 6,192,028 B1 | 2/2001 | Simmons et al. | |
| 6,636,523 B1 | 10/2003 | Lau et al. | |
| 7,464,174 B1 | 12/2008 | Ngai | |
| 7,698,478 B2 | 4/2010 | Wang et al. | |
| 2002/0159385 A1 | 10/2002 | Susnow et al. | |
| 2003/0226046 A1 | 12/2003 | John | |
| 2004/0019714 A1 | 1/2004 | Kelley et al. | |
| 2004/0049564 A1 | 3/2004 | Ng et al. | |
| 2005/0060558 A1 | 3/2005 | Hussain et al. | |
| 2005/0169290 A1 | 8/2005 | Sumita | |
| 2005/0259651 A1* | 11/2005 | Yashima | 370/389 |
| 2007/0121495 A1 | 5/2007 | Breti et al. | |
| 2008/0126606 A1* | 5/2008 | Wang et al. | 710/29 |
| 2009/0154456 A1* | 6/2009 | Dodson et al. | 370/389 |
| 2009/0254692 A1* | 10/2009 | Feehrer | 710/315 |

FOREIGN PATENT DOCUMENTS

WO  2006/109207  10/2006

OTHER PUBLICATIONS

Foreign Invention to Pay Additional Fees, From PCT/US2009/067360, mailed on Mar. 8, 2010, 5 pages.
PCI Express Base Specification, Rev. 1.0a, 2002, pp. 100-110, 123-127.
U.S. Appl. No. 11/523,330, filed Sep. 19, 2006.
International Search Report and Written Opinion from PCT/US2009/067360 mailed on Jun. 2, 2010, 18 pages.

* cited by examiner

*Primary Examiner* — Hassan Kizou
*Assistant Examiner* — Charles Jiang
(74) *Attorney, Agent, or Firm* — Lawrence J. Merkel; Meyertons, Hood, Kivlin, Kowert & Goetzel, P.C.

(57) ABSTRACT

In one embodiment, a receiver on a credit-based flow-controlled interface is configured to free one or more data credits early when a data payload is received that incurs fewer unused data credits within a buffer memory that is allocated at a coarser granularity than the data credits. In another embodiment, header credits and data credits are dynamically adjusted based on actual packet data payload sizes.

18 Claims, 7 Drawing Sheets

```
if ((rcv_packet == false) or (rcv_packet == Cat0){
  adaptive_credits = pending_credits;
}
  elsif (rcv_packet == Cat1) {
   if ((RlzdHeadCr + PendHeadCr) == MaxExHead)
     adaptive_credits = pending_credits;
   else
     adaptive_credits = pending_credits + {1, -3};
}
elsif (rcv_packet == Cat3) {
   if ((RlzdHeadCr + PendHeadCr) == -(MaxRecHead))
     adaptive_credits = pending_credits;
   else
     adaptive_credits = pending_credits + {-1, 3};
}
else { // (rcv_packet == Cat2)
   if ((RlzdHeadCr + PendHeadCr) == 0)
     adaptive_credits = pending_credits;
   elsif ((RlzdHeadCr + PendHeadCr) < 0)
     adaptive_credits = pending_credits + {1, -3};
   else // ((RlzdHeadCr + PendHeadCr) > 0)
     adaptive_credits = pending_credits + {-1, 3};
} remaining_pending_d = (PendHeadCr * 3) + PendDataCr;
```

Fig. 10

```
  if (adaptive_header_credit == 0) {
    realizable_header_credit = 0;
    realizable_data_credit = remaining_pending_d;
  }
  elsif (adaptive_header_credit < 0) {
    if (releasing_header_credit > -adaptive_header_credit)
      realizable_header_credit = adaptive_header_credit;
    else
      realizable_header_credit = -releasing_header_credit;
      realizable_data_credit = 3 * realizable_header_credit;
  }
  else { // (adaptive_header_credit > 0)
    maximum_realizable_header_credit =
            ((releasing_data_credit + remaining_pending_d) / 3);
    if (maximum_realizable_header_credit > adaptive_header_credit)
      realizable_header_credit = adaptive_header_credit;
    else
      realizable_header_credit = maximum_realizable_header_credit;
    if (realizable_header_credit != 0)
      realizable_data_credit =
            3 * realizable_header_credit - remaining_pending_d;
    elsif (remaining_pending_d < 2)
      if (releasing_data_credit > (2 - remaining_pending_d))
        realizable_data_credit = 2 - remaining_pending_d;
      else
        realizable_data_credit = releasing_data_credit;
    else
      realizable_data_credit = 0;
  }

RlzdHeadCr += realizable_header_credit;
  RlzdDataCr -= realizable_data_credit;
  PendHeadCr = adaptive_header_credit - realizable_header_credit;
  PendDataCr = adaptive_data_credit + realizable_data_credit;
  Release HCrs += releasing_header_credit + realizable_header_credit;
  Release DCrs += releasing_data_credit - realizable_data_credit;
```

Fig. 11

CREDIT MANAGEMENT WHEN RESOURCE GRANULARITY IS LARGER THAN CREDIT GRANULARITY

BACKGROUND

1. Field of the Invention

This invention is related to digital systems and, more particularly, to credit management for credit-based flow control mechanisms for interfaces in digital systems.

2. Description of the Related Art

Digital systems often include flow-controlled interfaces between integrated circuits (ICs) in the system, between systems, and sometimes even within an IC. The flow-control mechanism generally exists to prevent buffer overruns or other loss of data situations from occurring in a receiver. For example, a common flow control mechanism is credit-based. A receiver on the interface may broadcast the number of credits it has available for various types of transmissions, and a transmitter may record the credits. The transmitter can then transmit on the interface and deduct credits for each transmission. Once the credits run out, the transmitter must cease transmitting. The receiver, as it completes processing of received transmissions, frees the credits consumed by each transmission and transmits freed credits back to the transmitter.

The credits advertised by the receiver may generally be constrained by the available resources at the receiver for handling the transmissions. For example, buffers are generally provided to store received transmissions. The available buffers indicate how many credits can be advertised for each transmission type. In some cases, the buffers are implemented as a memory. If the memory cannot be allocated at the same granularity as the credits (or at a finer granularity), then inefficiencies in the use of the memory result. Generally, a full memory granule must be allocated to store any amount of data up to the full memory granule. Because data can be transmitted at less than the memory granule (or at some non-integer multiple of the memory granule), the number of credits that can be advertised is less than one might guess based on knowledge of the size of the memory. The achievable bandwidth on the interface is thus less than would be possible if the memory could be allocated with more granularity.

SUMMARY

In an embodiment, an apparatus comprises a receiver coupled to a buffer memory. The receiver comprises a credit management unit configured to manage flow control credits for an interface to which the receiver is coupled during use. Each packet received on the interface comprises a packet header and optionally packet data. The packet data is measured in terms of data credits in the flow control credits dependent on a size of the packet data, wherein each data credit represents a fixed number of data bytes. The buffer memory is configured to store packet headers and packet data corresponding to packets that are received on the interface by the receiver, wherein the buffer memory is allocable by the receiver in buffer units which are N times the size of the data credit, wherein N is an integer greater than one. A total number of data credits is equal to N times a number of buffer units in the buffer memory that are available to store packet data, and the credit management unit is configured to reserve a plurality of the total data credits based on a maximum number of data credits that are unusable if packet data does not fill a buffer unit and further based on a number of packets that are permitted to be in flight concurrently. The credit management unit is configured to free one or more data credits in response to receiving packet data for a given packet that incurs fewer than the maximum number of unusable data credits. The credit management unit is configured to free the one or more data credits prior to the given packet being consumed. A corresponding method is also contemplated.

In an embodiment, an apparatus comprises a receiver coupled to a buffer memory. The receiver comprises a credit management unit configured to manage flow control credits for an interface to which the receiver is coupled during use. Each packet received on the interface comprises a header and optionally data. The header is measured in terms of one or more header credits for flow control on the interface, and data is measured in terms of one or more data credits for flow control on the interface. Each data credit represents a fixed number of data bytes. The buffer memory is configured to store packet headers and packet data corresponding to packets that are received on the interface by the receiver. The credit management unit is configured to dynamically adjust a first amount of the buffer memory used to store packet headers and a second amount of the buffer memory used to store the packet data responsive to a size of the packet data in one or more received packets, and wherein the credit management unit is configured to free data credits and header credits to a transmitter on the interface responsive to the dynamic adjustments.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description.

As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
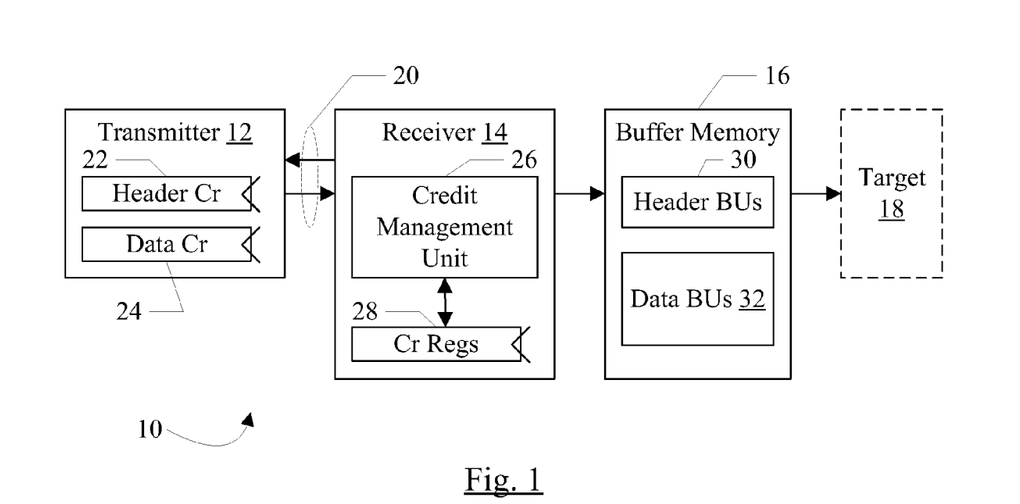
FIG. 1 is a block diagram of one embodiment of a digital system.

Turning now to FIG. 1, a block diagram of one embodiment of a system 10 is shown. In the illustrated embodiment, the system 10 includes a transmitter 12, a receiver 14, a buffer memory 16, and optionally a packet target 18. The transmitter is coupled to an interface 20 to which the receiver 14 is also coupled. The buffer memory 16 is coupled to the receiver 14 and the target 18.

The transmitter 12 is configured to maintain header credits and data credits, which indicate how much packet header and packet data traffic the receiver 14 is currently able to accept. For example, in FIG. 1, the transmitter 12 may include a header credit register 22 and a data credit register 24. During initialization of the system 10, and possibly at other points during operation at which the interface 20 is reset, the receiver 14 may determine the number of header credits and data credits to advertise to the transmitter 12. The transmitter 12 may initialize the registers 22 and 24 with the advertised credits. As the transmitter 12 transmits packet headers and packet data, the transmitter 12 may deduct the credits consumed by the transmitted headers and data. The receiver 14 may transmit freed credits back to the transmitter 12, which may add the freed credits to the registers 22 and 24. Thus, at any given point in time, the transmitter 12 may control how much information is transmitted over the interface 20 responsive to the credits in the registers 22 and 24. If not enough credits are available for a given transmission, for example, the transmitter 12 may delay transmission until the needed number of credits become available.

Generally, advertising credits refers to any mechanism for the receiver 14 to informing the transmitter 12 of the number of credits that are available. Similarly, freeing credits may refer to any mechanism for determining that credits consumed via a transmission on the interconnect 20 are available to be returned to the transmitter 12, and the mechanism for returning them. The mechanisms for performing the advertisement and the freeing are implementation-specific based on the definition of the interface 20, but may generally include transmitting on the interface 20 from the receiver 14 to the transmitter 12. For example, a packet may be defined that transmits freed credits, or fields in the headers used for all packets may include freed credits. Packets that transmit freed credits may be transmitted during initialization to advertise the desired number of credits. If more credits are being advertised than can be transmitted in the fields of the packets, then multiple packets may be transmitted.

Generally, packets transmitted on the interface 20 may include a header (which defines the type of packet and may provide other control information) and may optionally include data (or a "payload"). The header may be fixed in size, and thus each header may consume one header credit when it is transmitted by the transmitter 12. Other embodiments may implement variable sized headers and the number of header credits needed for a given packet may depend on the size of its header. The data payload may be variable in size. Accordingly, a data credit may be defined to represent a fixed number of data bytes (referred to as a "data unit"), and the number of data credits required for a given packet may be the size of the payload divided by the size of the data credit. The size of the data credit may be part of the interface 20 definition. For example, in one embodiment, the interface 20 may be the Peripheral Component Interconnect Express (PCIe) interface, and a data credit may represent 16 bytes.

The receiver 14 comprises a credit management unit 26, and may comprise one or more credit registers 28 to store values used by the credit management unit 26 to manage the credits for the transmitter 12. Additional details of various embodiments are provided below. The receiver 14 may also include various other circuitry to communicate on the interface 20, to communicate with the buffer memory 16, etc. Additionally, while FIG. 1 illustrates the transmitter 12 transmitting to the receiver 14, communication may be bidirectional on the interface 20. That is, the transmitter functionality may exist on both sides of the interface 20, and the receiver functionality may also exist on both sides. For simplicity in the discussion, the present description will refer to the transmitter 12 transmitting to the receiver 14, but it is understood that packets may be transmitted from the receiver 14 side in FIG. 1 to the transmitter 12 side.

In the illustrated embodiment, the interface 20 may comprise a pair of unidirectional, point to point links. Packets may be transmitted on the links. In other embodiments, the interface 20 may have other definitions. For example, the interface 20 could be a bus, having address and data transmissions. The address transmissions may be flow-controlled by address credits (similar to header credits), and the data transmissions may be flow-controlled by data credits. Any set of credits may be used, based on the definition of the interface 20. Generally, the sets of credits may be referred to as flow control credits.

The target 18 may generally refer to any circuitry that consumes packets from the buffer memory 16. The target 18 may be part of a device that includes the receiver 14 (e.g. an IC) or may be separate. For example, the receiver 14 may be a switch that receives packets and forwards them on another interface, in which case the consumption of the packet from the buffer memory 16 may be the forwarding of the packet on the other interface.

The buffer memory 16 may comprise any type of memory accessible to the receiver 14. For example, the buffer memory 16 may comprise system memory, such a dynamic random access memory (DRAM) coupled to a memory controller configured to interface to the DRAM. For example, various DRAM memory modules, such as single inline memory modules (SIMMs), dual inline memory modules (DIMMs), etc., may be supported. Any DRAM technology may be used (e.g. synchronous DRAM (SDRAM), dual data rate (DDR) SDRAM, DDR2 SDRAM, DDR3 SDRAM, Rambus DRAM (RDRAM), etc.). In such embodiments, the receiver 14 may generate write commands to the memory controller to write packet headers and packet data to the memory 16. The target 18 may generate read commands to the memory controller to read the packet headers and packet data. In other embodiments, the buffer memory 16 may comprise memory private to the receiver 14, or shared by the receiver 14 and one or more other receivers and/or transmitters in the system 10. The buffer memory 16 may comprise, for example, a cache memory or other dedicated buffer memory. The buffer memory 16 may comprise static RAM (SRAM) in some embodiments.

The buffer memory 16 may be allocated to store packet headers and packet data. Specifically, the buffer memory 16 may be allocated at a coarser granularity than the data credits (and/or header credits, in some embodiments). The buffer memory 16 may be allocated in granules referred to as buffer units (BUs) herein. Thus, in FIG. 1, header BUs 30 and data BUs 32 are shown. The remainder of this description may use an embodiment in which header credits have the same granularity as BUs, and data credits which are finer in granularity. However, embodiments are contemplated in which header credits are finer in granularity than BUs as well and a similar mechanism to the data credit mechanism may be used for header credits.

Figure 2:
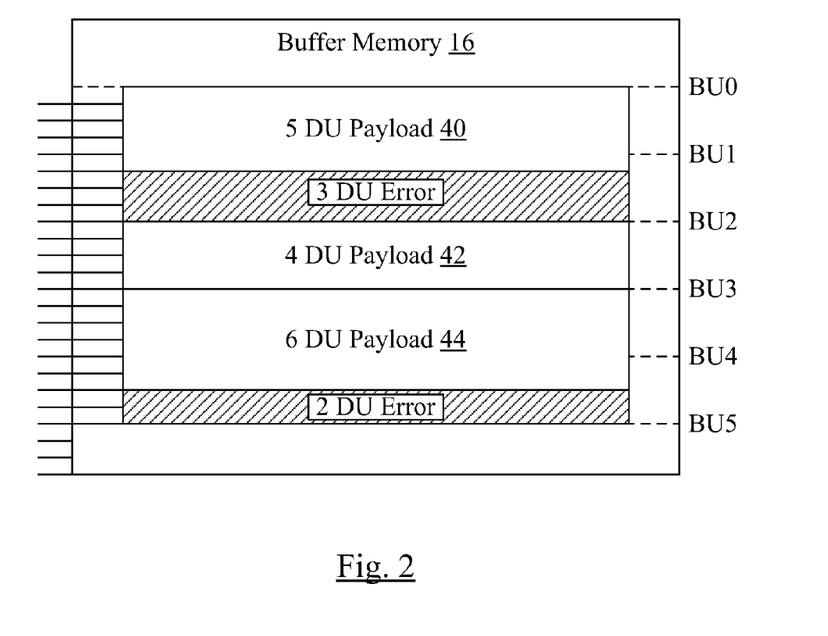
FIG. 2 is a block diagram of one embodiment of memory buffer allocation.

Because the BU granularity is coarser than the DU granularity, the buffer memory 16 may not be fully utilized to store data. FIG. 2 is a block diagram of an example illustrating less than full utilization, for a case in which the BU is 4 times the size of a DU. Other embodiments may generally include a BU that is N times the size of a DU, where N is an integer greater than one. In some embodiments, N may be a power of 2.

In general, the data payload of various packets may be between 0 and M DUs, where M is an integer greater than 0. The size of M may be implementation dependent, and may depend on the definition of the interface 20 (e.g. the interface 20 may define a maximum data payload size per packet). However, M may not necessarily have any particular relationship to N. That is, M/N need not be an integer for a given packet.

FIG. 2 illustrates BUs on the right side, with dotted lines extending inward to the data payloads stored in the example. On the left side, solid lines illustrate the DUs. As mentioned above, there are 4 DUs per BU in this example. A 5 DU payload 40 is shown in FIG. 2. The first 4 DUs are stored in BU0, and occupy the full BU. The fifth DU is stored in BU1. Since buffer memory 16 is allocated to store payload data at the BU granularity, the entirety of BU1 is allocated to the payload 40, leaving 3 DUs unused in BU1. Viewed in another way, 3 DUs of the buffer memory are unusable until the packet corresponding to the payload 40 is consumed, and may essentially constitute an accounting error with respect to the number of DUs (and thus data credits) consumed by the transmitter 12 to transmit the payload 40. That is, the transmitter 12 consumed 5 credits to transmit the payload 40, but the payload 40 actually occupies 8 credits of buffer memory 16.

Another payload 42 is illustrated in FIG. 2, which is 4 DUs in this example Accordingly, the payload 42 is stored in BU2, and there are no unused DUs. A third payload 44 is also shown, which is 6 DUs, occupying BU3 and 2 DUs of BU4 in FIG. 2. Accordingly, 2 more DUs in the buffer memory 16 are unused. In general, a packet may occupy up to P BUs, where one or more DUs in the last-occupied BU may be unused if the payload is not an even multiple of N DUs. In other cases, the unused DUs may exist at the beginning of the BUs occupied by a payload (e.g. if the payload is not required to align to the beginning of a BU), or both the beginning and the end. In any case, a maximum possible error for a data payload may be defined, based on the number of DUs that correspond to a BU (N). The maximum error occurs if one DU occupies a BU, and thus the maximum error for a given payload is N−1 DUs (or N−1 data credits).

Accordingly, for a given number Y of BUs that are allocable to store packet data, fewer than Y*N data credits are advertised to the transmitter 12. The credit management unit 26 may reserve data credits that could otherwise be advertised to ensure that overflow does not occur in the buffer memory 16. Specifically, the worst case total error may occur when each data payload incurs the maximum error (N−1). If up to C packets may be transmitted (e.g. the number of header credits is C), then the worst case overall error may be C−1 times N−1. C−1 is used because the last data payload's error is not detectable, since the transmitter 12 cannot transmit another packet when the header credits are exhausted.

When a given packet having a data payload is received, if the payload incurs less than the maximum error, some data credits may be freed immediately (before the packet is consumed). That is, the unused DUs in the buffer memory 16 for the data payload are less than the amount accounted for by the reserved credits that the credit management unit 26 did not broadcast to the transmitter 12. For example, in FIG. 2, the payload 42 realizes zero error, and thus three (N−1−0) data credits may be freed in response to receiving the payload 42. The payload 44 realizes 2 errors, and thus one (N−1−2) data credits may be freed in response to receiving the payload 44.

Once the packet is consumed, the reserved credits may be needed again (since the next packet that is received may have a payload that realizes the maximum number of unused DUs). Accordingly, the remaining credits that were actually consumed by the transmitter may be freed when the packet is consumed. That is, the number of credits freed at the time the packet is consumed is equal to the number of actual credits corresponding to the payload minus the number of credits freed when the packet was received.

By freeing credits corresponding to unrealized errors, it may be possible to transmit additional packets that would otherwise be delayed due to a lack of available data credits. That is, the bandwidth on the interface 20 may be more efficiently utilized.

Figure 3:
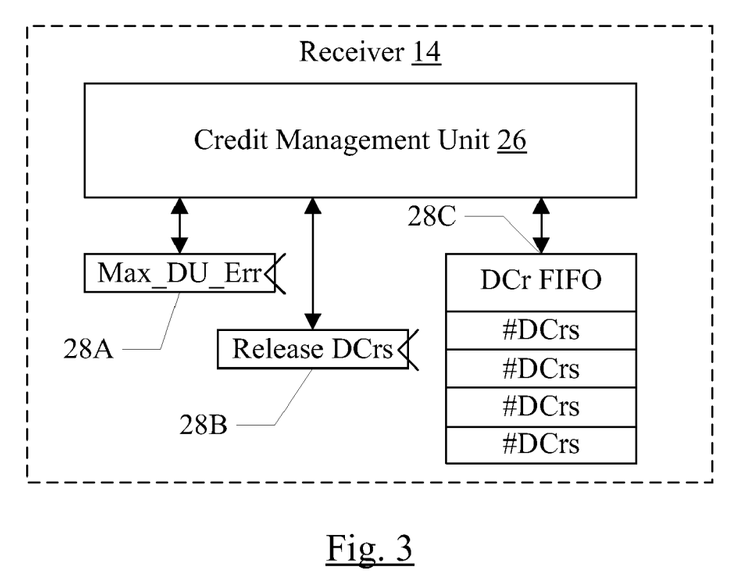
FIG. 3 is a block diagram of one embodiment of a receiver shown in FIG. 1.

FIG. 3 is a block diagram of one embodiment of the receiver 14 in more detail to implement early freeing of data credits for data payloads that incur fewer unused DUs than the maximum number of unused DUs. In the illustrated embodiment, the credit management unit 26 is shown, and is coupled to a maximum DU error register 28A and a released data credits (DCrs) register 28B. The registers 28A-28B may be part of the Cr registers 28 shown in FIG. 1. Also shown in FIG. 3 is a DCr FIFO 28C, which may be implemented as one or more Cr registers 28 or as a FIFO memory or other memory. Alternatively, the DCr FIFO 28C may not be implemented, and instead the data stored therein may be queued with the received packets (e.g. in the buffer memory 16).

The credit management unit 26 may refer to the maximum number of unused DUs to calculate credits to free at various points. The maximum DU error register 28A may store this value. Either the credit management unit 26 may generate the value, or the value may be programmed into the register 28A by software. In some embodiments, both the DU and the BU may be fixed and may be hard coded into the credit management unit 26, and the register 28A may be eliminated.

In one embodiment, the credit management unit 26 may accumulate freed credits to be transmitted to the transmitter 12 in the released data credits register 28B. The credit management unit 26 may use any mechanism to determine when to transmit the freed credits. For example, the freed credits may be transmitted once a certain number of credits have been accumulated (e.g. over a programmable threshold), after a certain period of time has elapsed since the last transmission of freed credits, a combination of elapsed time and number of freed credits, etc. A similar register may be used to accumulate freed header credits, or fields in the same register may be used.

The DCr FIFO 28C may store a number of data credits (#DCrs) for each packet that is stored in the buffer memory 16. As the packets are consumed from the buffer memory, the corresponding number of data credits may be read from the DCr FIFO 28C and freed. The credit management unit 26 may calculate the number of data credits for each received packet based on the total number of data credits consumed to transmit the packet and the number of data credits freed in response to receiving the packet.

Figure 4:
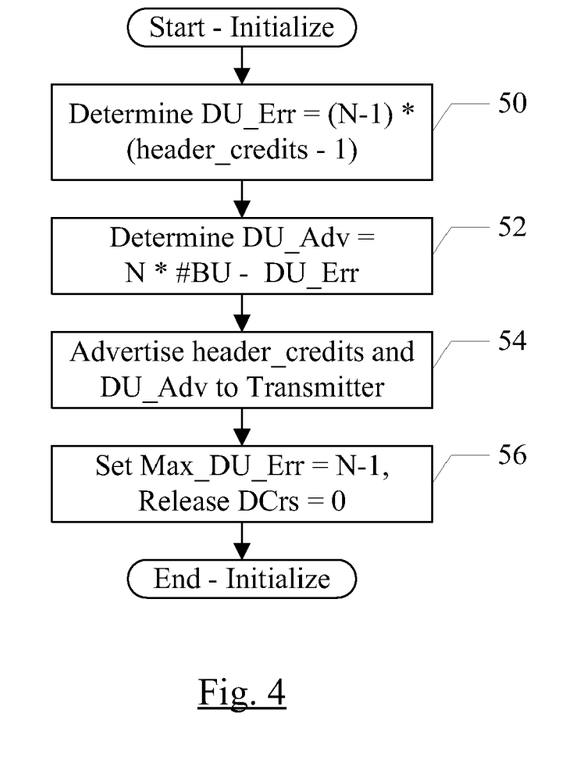
FIG. 4 is a flowchart illustrating operation of one embodiment of the receiver shown in FIG. 3 during initialization of the system shown in FIG. 1.

FIG. 4 is a flowchart illustrating operation of one embodiment of the receiver 14 during initialization of the system 10.

While the blocks are shown in a particular order for ease of understanding, other orders may be used. Blocks may be performed in parallel in combinatorial logic within the receiver 14. Blocks, combinations of blocks, and/or the flowchart as a whole may be pipelined over multiple clock cycles.

The credit management unit 26 may determine a total potential DU error (DU_Err) based on the number of header credits to be advertised to the transmitter 12 (header_credits) and the number of DUs per BU (N). Specifically, the DU_Err is given by (N−1)*(header_credits−1) (block 50). The credit management unit 26 may determine the number of DUs (data credits) to advertise to the transmitter 12 (DU_Adv). Specifically, DU_Adv may be calculated as the total number of DUs in the buffer memory 16 (N*the number of BUs allocated to store packet data) minus the DU_Err determined in block 50 (block 52). Effectively, the DU_Err may be the number of data credits reserved to handle the unused DUs that may occur in the BUs within the buffer memory 16. The credit management unit 26 may advertise the header credits and the DU_Adv for the data credits (block 54). Additionally, the credit management unit 26 may set the Max_DU_Err in the register 28A to N−1 and may also initialize the released data credits in the register 28B to zero (block 56).

Figure 5:
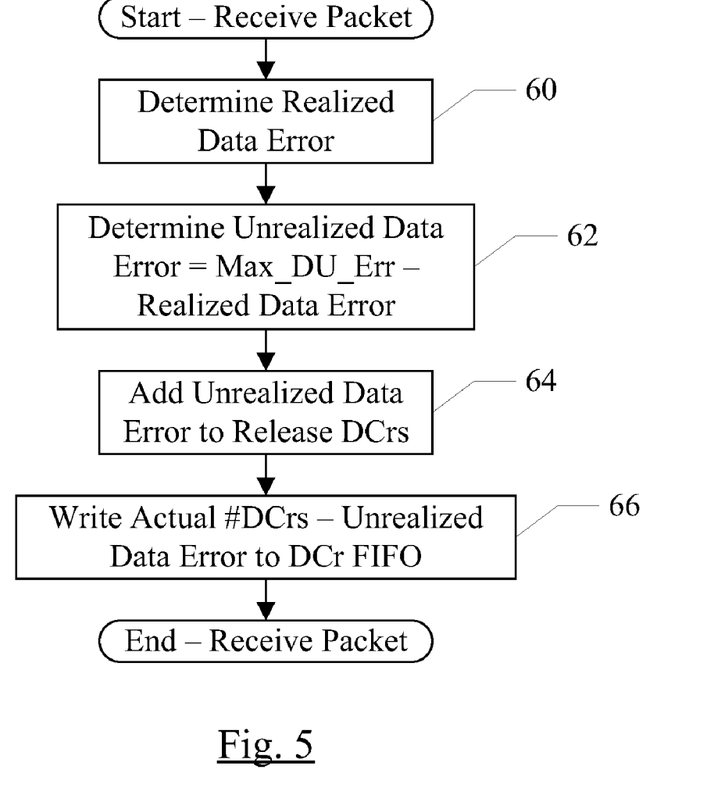
FIG. 5 is a flowchart illustrating operation of one embodiment of the receiver shown in FIG. 3 in response to receiving a packet in the system shown in FIG. 1.

FIG. 5 is a flowchart illustrating operation of one embodiment of the receiver 14 in response to receiving a packet on the interface 20. While the blocks are shown in a particular order for ease of understanding, other orders may be used. Blocks may be performed in parallel in combinatorial logic within the receiver 14. Blocks, combinations of blocks, and/or the flowchart as a whole may be pipelined over multiple clock cycles.

The credit management unit 26 may determine the realized data error in the payload (i.e. the number of DUs that are unused in the BU(s) storing the payload data) (block 60). The credit management unit 26 may determine the unrealized data error=Max_DU_Err—realized data error (block 62). The unrealized data error is the number of data credits that may be freed upon receipt of the packet. The credit management unit 26 may add the unrealized data error to the released data credits in the released DCr register 28B (block 64). Additionally, the credit management unit 26 may store the number of data credits to be freed when the packet is consumed from the buffer memory 16 in the DCr FIFO 28C (block 66). Specifically, the number written to the FIFO is the actual number of data credits corresponding to the payload minus the unrealized data error.

Figure 6:
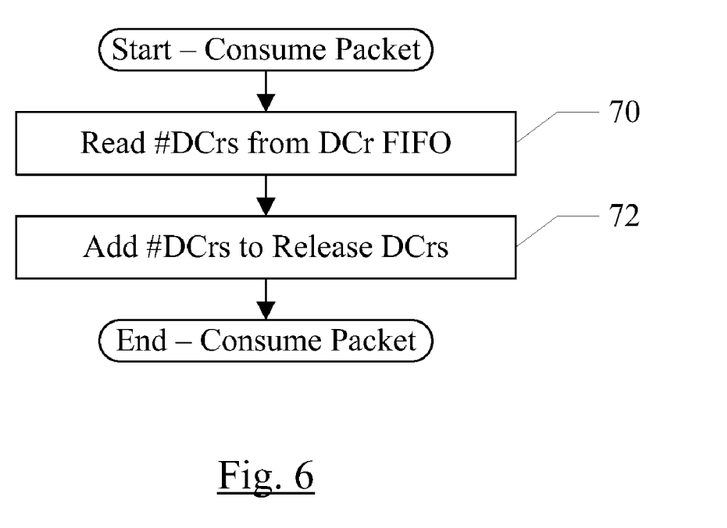
FIG. 6 is a flowchart illustrating operation of one embodiment of the receiver shown in FIG. 3 in response to a packet being consumed by a target in the system shown in FIG. 1.

FIG. 6 is a flowchart illustrating operation of one embodiment of the receiver 14 in response to a packet being consumed from the buffer memory 16. Generally, a packet is consumed when it has been read from the buffer memory 16 by the target 18 or the packet otherwise does not need to be stored in the buffer memory 16 any longer (e.g. the packet has been dropped). While the blocks are shown in a particular order for ease of understanding, other orders may be used. Blocks may be performed in parallel in combinatorial logic within the receiver 14. Blocks, combinations of blocks, and/or the flowchart as a whole may be pipelined over multiple clock cycles.

The credit management unit 26 may read the number of data credits from the entry in the DCr FIFO 28C, and may add the number of data credits to the released data credits in the register 28B, thus freeing the data credits (blocks 70 and 72). In one embodiment, packets may be consumed in the order received and the number of data credits may be read from the head of the FIFO. If packets are consumed in a different order, an offset into the FIFO to the desired entry may be provided.

It is noted that FIGS. 4-6 illustrate operations related to the early freeing of data credits based on the actual number of unused DUs in a BU as compared to the maximum number that is reserved for each payload. The receiver 14 and/or the credit management unit 26 may include additional operation at each point described above as well.

Another embodiment of the receiver 14 may implement adaptive credit management, in addition to or instead of the early freeing of data credits discussed above. With adaptive credit management, the receiver 14 attempts to match the buffer memory 16 that is allocated to headers and the buffer memory 16 that is allocated to data to the traffic that is actually being received on the interface 20. That is, as the size of the data payloads increase, having more data credits and fewer header credits may permit more efficient use of the interface bandwidth (since each packet still only requires one header credit, but multiple data credits for the payload). As the size of the data payloads decrease, having fewer data credits and more header credits may be permit more efficient use of the interface bandwidth (since the ratio of required header credits to required data credits for each packet is increasing).

Accordingly, the credit management unit 26 may monitor the size of the data payloads received by the receiver 14, and may dynamically modify the amount of buffer memory allocated to headers (e.g. the size of the header BUs 30) and the amount of buffer memory allocated to data payload (e.g. the size of the data BUs 32). Alternatively, the amount of memory allocated to headers may be large enough to accommodate the largest number of headers desired, but the credits may be managed to increase or decrease the number of header credits and the number of data credits available to the transmitter. Such dynamic credit management may still permit more efficient usage of the buffer memory 16, since the number of header credits affects the number of data credits to be reserved based on the unused DUs in the BUs, as discussed previously.

In one embodiment, header and data credits (and corresponding buffer memory allocations) may be initialized for packets having data payloads approximately in the middle of the expected size of the payloads. For example, in one embodiment, the interface 20 may be the PCIe interface, and the size of the data payloads may be between 0 and 256 bytes, and the credits may be initialized for 128 byte payloads. Then, dynamic adjustment may be performed responsive to the actual size of payloads experienced during operation.

Figure 7:
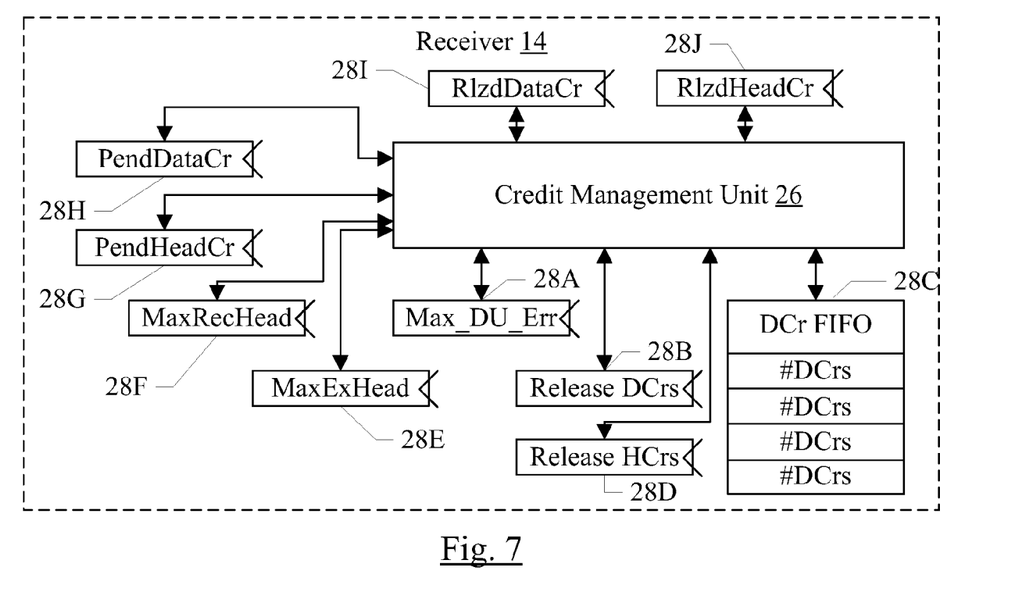
FIG. 7 is a block diagram of another embodiment of a receiver shown in FIG. 1.

FIG. 7 is a block diagram of one embodiment of the receiver 14 in more detail for implementing one embodiment of the dynamic credit management along with the early freeing of data credits discussed previously. The embodiment of FIG. 7 may include the registers 28A and 28B, and the FIFO 28C, as previously discussed. Additionally, a released header credits (HCrs) register 28D, a maximum extra header credit (MaxExHead) register 28E, a maximum recalled header credit (MaxRecHead) register 28F, a pending header credit (PendHeadCr) register 28G, a pending data credit (PendDataCr) register 28H, a realized data credit (RlzdDataCr) register 28I, and a realized header credit (RlzdHeadCr) register 28J are included, all coupled to the credit management unit 26 as shown in FIG. 7.

The released header credit register 28D may be similar to the register 28B, but may accumulate header credits that have been freed. Alternatively, as mentioned previously, the released header credits and released data credits may be accumulated in two fields of the same register, if desired. The MaxExHead and MaxRecHead registers 28E-28F may set bounds on the dynamic credit management. These registers may be automatically set by the credit management unit 26, as discussed below, or may be programmed by software, as desired. Specifically, the maximum number of additional header credits that may be allocated by withholding data credits is indicated by the MaxExHead register 28E. The maximum number of header credits that may be withheld to release additional data credits is indicated by the MaxRecHead register 28F.

The pending header credit and pending data credit registers 28G-28H may accumulate planned header and data credit adjustments as well as the freed header or data credits requested for satisfying the planned adjustments. These accumulations may be performed as dynamic adjustments occur, to capture credits that are not handled in the dynamic adjustment. For example, in one embodiment, an increase of one header credit requires a decrease of 3 data credits. If three data credits are not yet available, the available data credits may be accumulated in the register 28H. The pending header and data credits may be signed values to permit the capture of needed credits that may be obtained via subsequently freed credits. The realized data credit and header credit registers 28I-28J store signed realized header credit adjustments and data credit adjustments.

Figure 8:
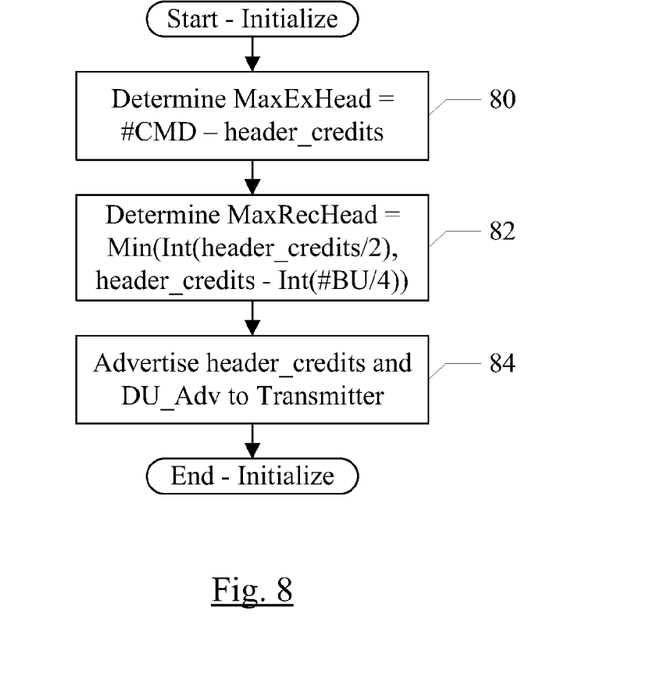
FIG. 8 is a flowchart illustrating additional operation of one embodiment of the receiver shown in FIG. 7 during initialization of the system shown in FIG. 1.

Turning now to FIG. 8, a high level flowchart illustrating operation of one embodiment of the receiver 14 during initialization of the system 10 to perform adaptive credit management is shown. The operation of FIG. 8 may be in addition to the operation of FIG. 4, for embodiments that also implement early freeing of data credits. While the blocks are shown in a particular order for ease of understanding, other orders may be used. Blocks may be performed in parallel in combinatorial logic within the receiver 14. Blocks, combinations of blocks, and/or the flowchart as a whole may be pipelined over multiple clock cycles.

The credit management unit 26 may initialize the MaxExHead register 28A to be the maximum number of headers permitted (#CMD) minus the number of header credits allocated for a medium sized packet (header credits). The #CMD may be a hardware maximum, or may be programmed by software based on the allocation of header BUs 30. The number of header credits may, e.g., be equal to the number of data BUs divided by two for a medium sized packet. Thus, the maximum number of additional header credits may be the remaining, unallocated space in the header BUs 30 (block 80). The maximum number of recalled header credits (header credits that are dynamically removed to permit additional data credits—MaxRecHead) may be initialized as the minimum of half the current header credits or the header credits minus the integer portion of the total number of data BUs in the buffer memory 16 divided by 4 (block 82). Half of the number of header credits may be selected as being a reasonable number for the largest packets. The number of data BUs divided by 4 may be a minimum for this embodiment because the maximum data payload is 4 BUs. It is noted that, in one embodiment, the maximum recalled header credits may be set to zero if the initial number of header credits is less than or equal to 2. When there are two or one header credits, no benefit may be achievable by reducing the header credits since the lack of header credits may prevent the use of additional data credits. The credit management unit 26 may advertise the number of header credits and the DU_Adv data credits (block 84).

Figure 9:
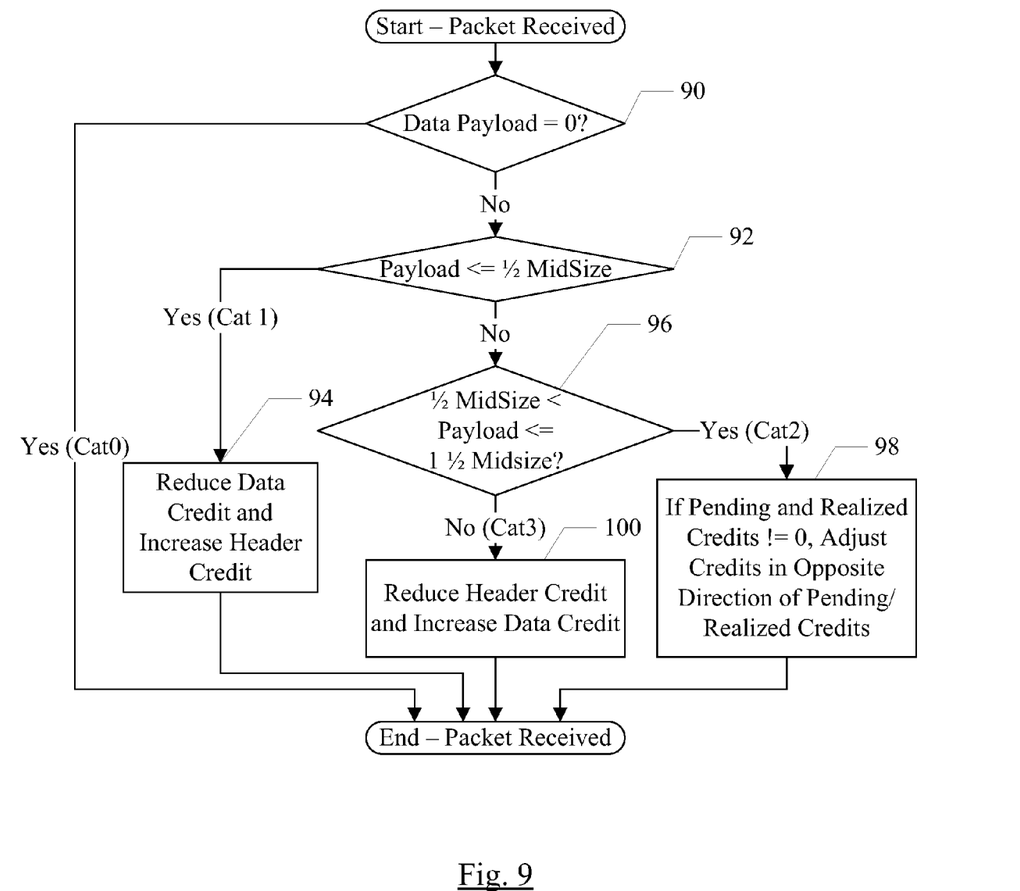
FIG. 9 is a flowchart illustrating additional operation of one embodiment of the receiver shown in FIG. 7 in response to receiving a packet in the system shown in FIG. 1.

Turning now to FIG. 9, a high level flowchart illustrating operation of one embodiment of the receiver 14 in response to receiving a packet is shown. The operation of FIG. 9 may be in addition to the operation of FIG. 5, for embodiments that also implement early freeing of data credits. While the blocks are shown in a particular order for ease of understanding, other orders may be used. Blocks may be performed in parallel in combinatorial logic within the receiver 14. Blocks, combinations of blocks, and/or the flowchart as a whole may be pipelined over multiple clock cycles.

Generally, the credit management unit 26 may categorize the packet into one of 4 categories based on the size of its data payload, and may adjust credits according to the category. Thus, the present embodiment may make adjustments based on each received packet. Other embodiments may monitor packet size over two or more packets to make adjustments, as desired.

If the packet does not include a data payload (decision block 90, "yes") leg, the packet is a Cat0 packet and no adjustments are made. If the packet includes a data payload that is less than or equal to ½ of the midsize packet data payload (e.g. 64 bytes in the PCIe embodiment mentioned above) (decision block 92, "yes" leg), the packet is a Cat1 packet. The data payload is relatively small for Cat1 packets, and thus reducing data credits and increasing header credits may lead to better interface bandwidth usage (block 94). If the packet includes a data payload that is between ½ of the midsize packet and 1½ of the midsize packet (decision block 96, "yes" leg), the packet is a Cat2 packet. In Cat2, the packet data payload is approximately in the middle size. In the Cat2 size range, the initial header and data credits are approximately correct. If the pending and realized credits are not zero, the credit management unit may adjust credits in the opposite direction of the most recent adjustment (block 98). That is, if the most recent adjustment was to increase header credits and decrease data credits, the credit management unit may increase data credits and decrease header credits. If the most recent adjustment was to decrease header credits and increase data credits, the credit management unit may decrease data credits and increase header credits. Lastly, if the data payload is large (greater than 1.5 times the midsize packet, decision block 96, "no" leg), the packet is a Cat3 packet. The large payload (Cat3) packets may be benefit from more data credits and fewer header credits, and thus the credit management unit 26 may reduce header credits and increase data credits (block 100).

It is noted that, if the MaxHeadCr and MaxRecHead registers 28F-28G are used to put bounds on the dynamic credit adjustments, the operation of FIG. 9 may be subject to the limits (i.e. credits may not be adjusted as shown if the adjustments would violate the bounds set by the MaxHeadCr and MaxRecHead registers 28F-28G).

Figure 10:
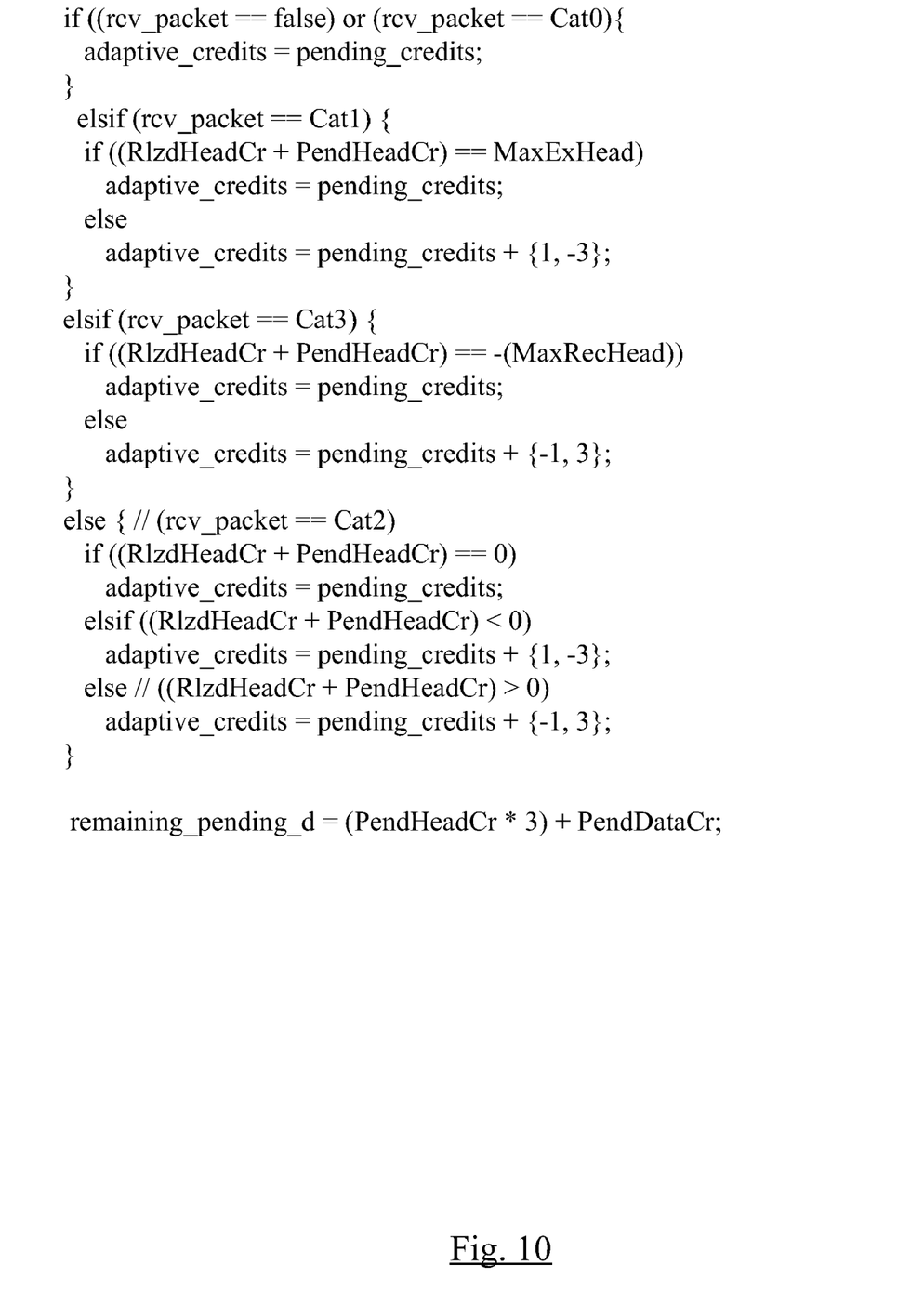
FIGS. 10 and 11 are pseudocode illustrating additional details of one embodiment of the receiver shown in FIG. 7.
Figure 11:
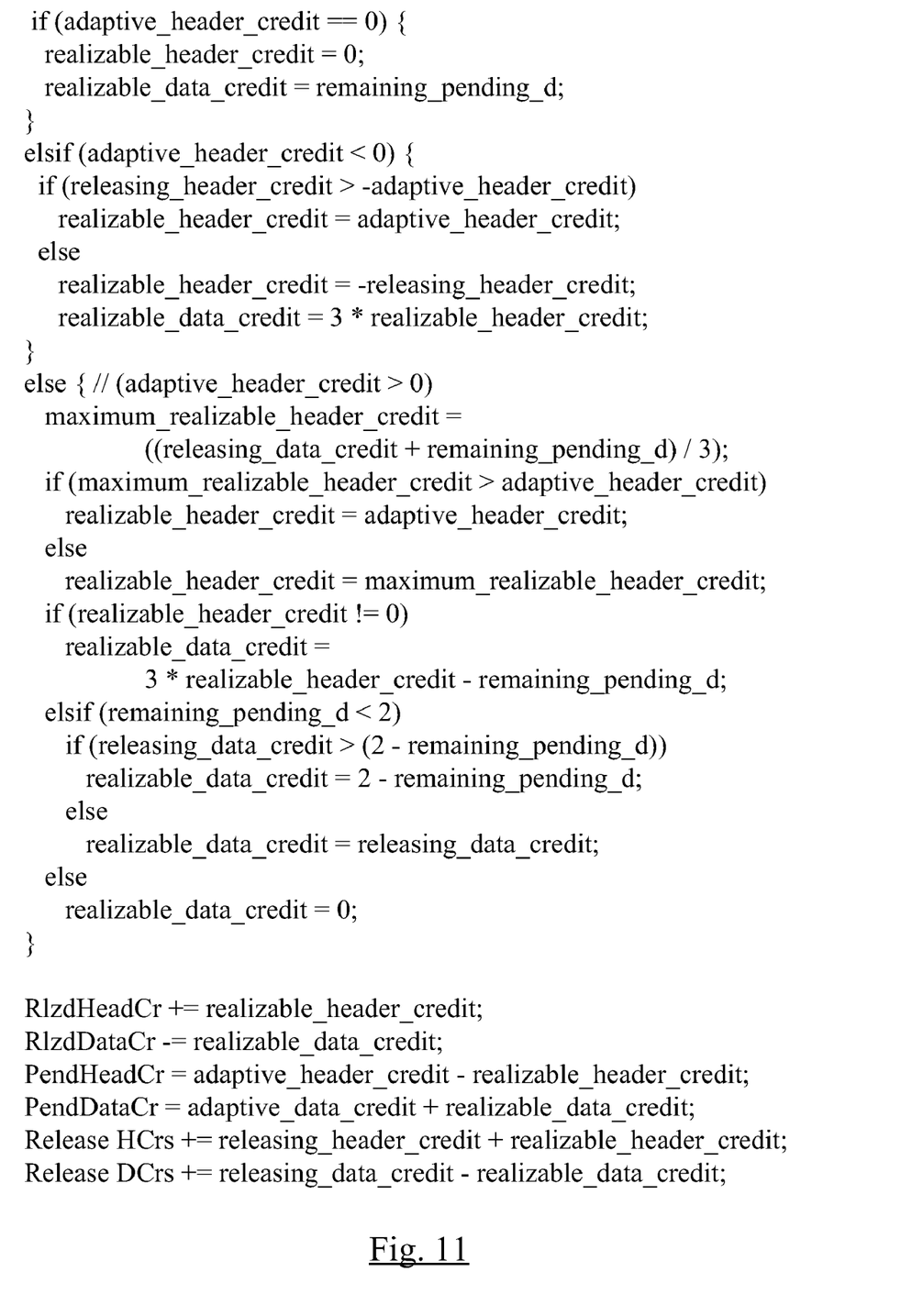

FIGS. 10 and 11 show pseudocode that illustrates the operation of FIG. 9 in greater detail, for one embodiment. The register names shown in FIG. 7 are illustrated in the pseudocode. Additionally, for convenience in the pseudocode, a vectorized notation for header and data credits is used. Specifically, adaptive_credits is defined to be{adaptive_header_credits, adaptive_data credits} and pending_credits is defined to be {PendHeadCr, PendDataCr}. The adaptive_credits are the (potentially adjusted) header and data credits. The releasing_header_credits and releasing_data_credits are the credits currently being freed. The releasing_data_credits may include data credits freed early when realized data error is less than the maximum error for a given packet, as described previously. Both releasing credits variables also include credits released due to packet consumption from the buffer memory 16.

FIG. 10 illustrates the generation of the adaptive_credits. Generally, the adaptive_credits are equal to the pending_credits if the bounds have been reached. Otherwise, the adaptive_credits may include the pending_credits plus or minus credits depending on the category of the received packet (and depending on the most recent adjustments, in the case of Cat2 packets). In the present embodiment, the most recent adjustment is detected by summing the pending header credits and realized header credits and comparing them to zero.

As can be seen in FIG. 10, in the present embodiment, 1 header credit is equal to 3 data credits. Thus, increasing the header credits by 1 decreases the data credits by 3, and vice versa. Other embodiments may have different ratios of header credits to data credits, based on the N−1.

Finally, in FIG. 10, the intermediate value remaining pending_d is calculated. The remaining pending_d should be less than or equal to 0 and less than 3. In one embodiment, if the PendHeadCr is negative, remaining pending_d is 0.

FIG. 11 illustrates the calculation of the realizable credits, based on the adaptive credits determined in FIG. 10 and the releasing credits. Again, the example of FIG. 11 is based on 3 data credits being equal to one header credit, which permits 1 or 2 data credits to be pending at any given point in time. Finally, the update of the registers 28B, 28D, and 28G-28J is shown in FIG. 11, where "+=" stands for incrementing the current value of the register by the right hand side of the equal sign, and "−=" stands for decrementing the current value of the register by the right hand side of the equal sign.

Numerous variations and modifications will become apparent to those skilled in the art once the above disclosure is fully appreciated. It is intended that the following claims be interpreted to embrace all such variations and modifications.

What is claimed is:

1. An apparatus comprising:
a receiver comprising a credit management unit configured to manage flow control credits for an interface to which the receiver is coupled during use, wherein each packet received on the interface comprises a packet header and optionally packet data, and wherein the packet data is measured in terms of data credits in the flow control credits dependent on a size of the packet data, wherein each data credit represents a fixed number of data bytes; and
a buffer memory coupled to the receiver and configured to store packet headers and packet data corresponding to packets that are received on the interface by the receiver, wherein the buffer memory is allocable by the receiver in buffer units which are N times the size of the data credit, wherein N is an integer greater than one; and
wherein a total number of data credits is equal to N times a number of buffer units in the buffer memory that are available to store packet data, and wherein the credit management unit is configured to reserve a plurality of the total data credits based on a maximum number of data credits that are unusable if packet data does not fill a buffer unit and further based on a number of packets that are permitted to be in flight concurrently, and wherein the credit management unit is configured to free one or more data credits in response to receiving packet data for a given packet that incurs fewer than the maximum number of unusable data credits, wherein the credit management unit is configured to free the one or more data credits prior to the given packet being consumed.

2. The apparatus as recited in claim 1 wherein the credit management unit is configured to free additional data credits in response to consumption of the given packet, wherein a number of the additional data credits is equal to a number of data credits corresponding to the packet data of the given packet minus the one or more data credits freed in response to receiving the given packet.

3. The apparatus as recited in claim 1 wherein the receiver is configured to advertise a number of data credits to a transmitter on the interface during initialization of the apparatus, wherein the number of data credits advertised is no greater than the total number of data credits minus the reserved data credits.

4. The apparatus as recited in claim 1 wherein the maximum number of data credits that are unusable for a given packet is equal to N−1.

5. The apparatus as recited in claim 1 wherein the credit management unit is configured to dynamically adjust a first amount of the buffer memory used to store packet headers and a second amount of the buffer memory used to store packet data responsive to monitoring a size of the packet data included in received packets.

6. A method comprising:
receiving a packet from an interface, wherein the packet comprises packet data that consumes one or more data credits at a transmitter on the interface based on a size of the packet data, wherein each data credit represents a fixed number of data bytes;
storing the packet data in a buffer memory, wherein the buffer memory is allocable to store packet data in buffer units which are N times the size of the data credit, wherein N is an integer greater than one, and wherein up to N−1 data credits are unusable responsive to the packet data not filling a buffer unit allocated to store the packet data; and
responsive to receiving the packet and prior to the packet being consumed, determining that the packet data incurs fewer than N−1 unusable data credits, and freeing one or more data credits that are useable responsive to the determining.

7. The method as recited in claim 6 further comprising reserving a plurality of data credits from a total number of data credits, wherein the total number of data credits is equal to N times a number of buffer units in the buffer memory that are available to store packet data, wherein a number of the plurality of data credits is based on N−1 data credits that are unusable if packet data does not fill a buffer unit and is further based on a number of packets that are permitted to be in flight concurrently.

8. The method as recited in claim 7 further comprising advertising a number of data credits to a transmitter on the interface during initialization, wherein the number of data credits advertised is no greater than the total number of data credits minus the reserved data credits.

9. The method as recited in claim 6 further comprising freeing additional data credits in response to consumption of the packet, wherein a number of the additional data credits is equal to a number of data credits corresponding to the packet data of the given packet minus the one or more data credits freed in response to receiving the given packet.

10. The method as recited in claim 6 further comprising transmitting an indication of the freed data credits to a transmitter.

11. An apparatus comprising:
a receiver comprising a credit management unit configured to manage flow control credits for an interface to which the receiver is coupled during use, wherein each packet received on the interface comprises a header and optionally data, and wherein the header is measured in terms of one or more header credits for flow control on the interface, and wherein data is measured in terms of one or more data credits for flow control on the interface, each data credit representing a fixed number of data bytes; and a buffer memory coupled to the receiver and configured to store packet headers and packet data corresponding to packets that are received on the interface by the receiver; and wherein the credit management unit is configured to dynamically adjust a first amount of the buffer memory allocated to store packet headers and a second amount of the buffer memory allocated to store the packet data responsive to a size of the packet data in one or more received packets, and wherein the credit management unit is configured to free credits to a transmitter on the interface responsive to the dynamic adjustments, and wherein the credit management unit is configured to increase the first amount and decrease the second amount, and wherein the credit management unit is configured to withhold one or more data credits corresponding to a consumed packet and to instead free one or more header credits to effect the modification, and wherein a header credit represents N−1 times the fixed number of data bytes that are represented by a data credit, and wherein the credit management unit is configured to withhold N−1 data credits to free one header credit.

12. The apparatus as recited in claim 11 wherein the credit management unit is configured to increase the first amount and decrease the second amount responsive to receiving one or more packets having packet data smaller in size than a first threshold.

13. The apparatus as recited in claim 11 wherein the credit management unit is configured to decrease the first amount and increase the second amount, and wherein the credit management unit is configured to withhold one or more header credits corresponding to a consumed packet and to instead free one or more data credits to effect the adjustment at the transmitter.

14. The apparatus as recited in claim 13 wherein the credit management unit is configured to decrease the first amount and increase the second amount responsive to receiving one or more packets having packet data larger in size than a second threshold.

15. The apparatus as recited in claim 11 wherein the credit management unit is configured to determine a minimum size of the first amount and a maximum size of the first amount, and wherein the credit management unit is configured to limit the dynamic modification of the first amount and the second amount based on the minimum size and the maximum size.

16. An apparatus comprising:
a receiver comprising a credit management unit configured to manage flow control credits for an interface to which the receiver is coupled during use, wherein each packet received on the interface comprises a header and optionally data, and wherein the header is measured in terms of one or more header credits for flow control on the interface, and wherein data is measured in terms of one or more data credits for flow control on the interface, each data credit representing a fixed number of data bytes; and a buffer memory coupled to the receiver and configured to store packet headers and packet data corresponding to packets that are received on the interface by the receiver; and wherein the credit management unit is configured to dynamically adjust a first amount of the buffer memory used to store packet headers and a second amount of the buffer memory used to store the packet data responsive to a size of the packet data in one or more received packets, and wherein the credit management unit is configured to free data credits and header credits to a transmitter on the interface responsive to the dynamic adjustments, and wherein the credit management unit is configured to perform an opposite adjustment than a most recently performed adjustment responsive to receiving one or more packets having packet data larger in size than a first threshold and smaller in size than a second threshold.

17. A method, in a receiver configured to manage flow control credits for an interface to which the receiver is coupled during use, wherein each packet received on the interface comprises a header and optionally data, and wherein the header is measured in terms of a header credit for flow control on the interface, and wherein data is measured in terms of one or more data credits for flow control on the interface, each data credit representing a fixed number of data bytes, the method comprising:

dynamically adjusting a first amount of the header credits and a second amount of the data credits, the dynamically adjusting responsive to a size of the packet data in one or more received packets, wherein the dynamically adjusting comprises increasing the first amount and decreasing the second amount; and freeing credits to a transmitter on the interface responsive to the dynamic adjustments, and wherein the freeing comprises withholding one or more data credits corresponding to a consumed packet and instead freeing one or more header credits to effect the adjustment at the transmitter, and wherein a header credit represents N−1 times the fixed number of data bytes that are represented by a data credit, and wherein the withholding includes withholding N−1 data credits to free one header credit.

18. The method as recited in claim 17 wherein the dynamically adjusting comprises decreasing the first amount and increasing the second amount, and wherein the freeing comprises withholding one or more header credits corresponding to a consumed packet and instead freeing one or more data credits to effect the adjustment at the transmitter.

* * * * *